US009358975B1

(12) United States Patent
Watts

(10) Patent No.: US 9,358,975 B1
(45) Date of Patent: Jun. 7, 2016

(54) VIRTUAL MOVING SAFETY LIMITS FOR VEHICLES TRANSPORTING OBJECTS

(71) Applicant: Google Inc., Mountain View, CA (US)

(72) Inventor: Kevin William Watts, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/683,721

(22) Filed: Apr. 10, 2015

(51) Int. Cl.
*B60W 30/04* (2006.01)
*G05D 1/00* (2006.01)

(52) U.S. Cl.
CPC .............. *B60W 30/04* (2013.01); *G05D 1/0011* (2013.01); *G05D 1/0027* (2013.01); *B60W 2300/12* (2013.01); *B60W 2520/10* (2013.01); *B60W 2520/125* (2013.01); *B60W 2530/10* (2013.01)

(58) Field of Classification Search
CPC ............ B60W 30/04; B60W 2520/10; B60W 2520/125; B60W 2300/12; B60W 2530/10; G05D 1/0011; G05D 1/0027
See application file for complete search history.

(56) References Cited

U.S. PATENT DOCUMENTS

| 7,756,621 | B2 | 7/2010 | Pillar et al. |
| 7,822,513 | B2 | 10/2010 | Wulff |
| 8,515,629 | B2 | 8/2013 | Medwin et al. |
| 8,589,012 | B2 | 11/2013 | Wong et al. |
| 2004/0120766 | A1* | 6/2004 | Silay ...................... E01C 23/088 404/84.1 |
| 2005/0092533 | A1* | 5/2005 | Ishii ......................... B60K 1/02 180/65.1 |
| 2011/0071752 | A1* | 3/2011 | Takenaka ................ B60L 15/10 701/124 |
| 2012/0173108 | A1* | 7/2012 | Takenaka ................. B62J 25/00 701/70 |
| 2012/0173109 | A1* | 7/2012 | Akimoto .................. B62K 1/00 701/70 |

FOREIGN PATENT DOCUMENTS

EP          2185390 B1     9/2013

* cited by examiner

*Primary Examiner* — James Trammell
*Assistant Examiner* — James E Stroud
(74) *Attorney, Agent, or Firm* — McDonnell Boehnen Hulbert & Berghoff LLP

(57) ABSTRACT

Example systems and methods are disclosed for implementing vehicle operation limits to prevent vehicle load failure during vehicle teleoperation. The method may include receiving sensor data from sensors on a vehicle that carries a load. The vehicle may be controlled by a remote control system. The load weight and dimensions may be determined based on the sensor data. In order to prevent a vehicle load failure, a forward velocity limit and an angular velocity limit may be calculated. Vehicle load failures may include the vehicle tipping over, the load tipping over, the load sliding off of the vehicle, or collisions. The vehicle carrying the load may be restricted from exceeding the forward velocity limit and/or the angular velocity limit during vehicle operation. The remote control system may display a user interface indicating to a remote operator the forward velocity limit and the angular velocity limit.

20 Claims, 14 Drawing Sheets

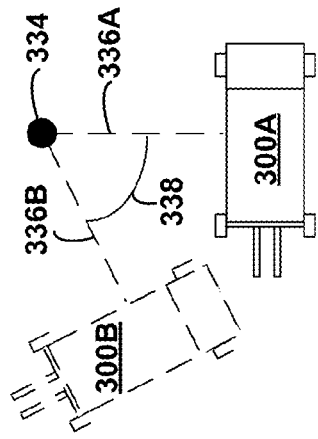
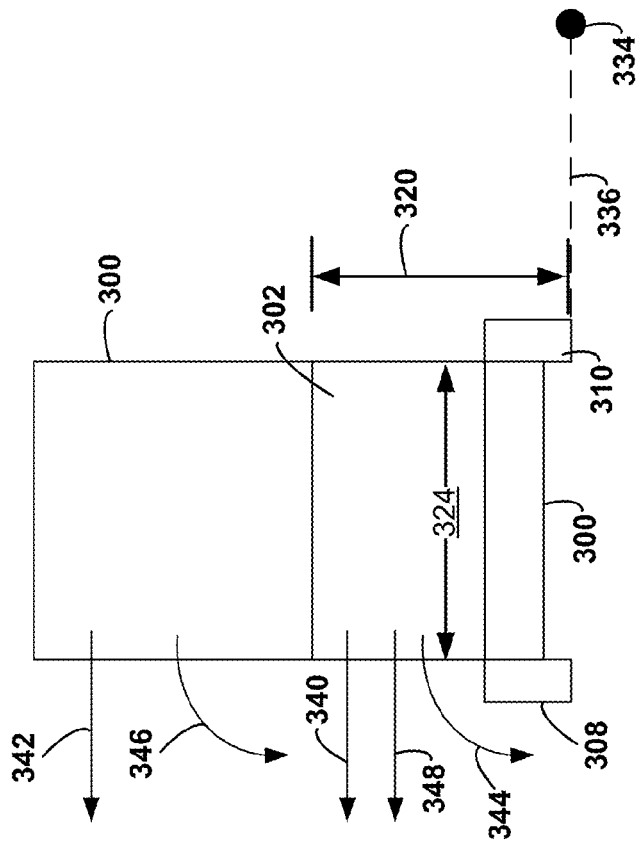
FIG. 3D
FIG. 3C

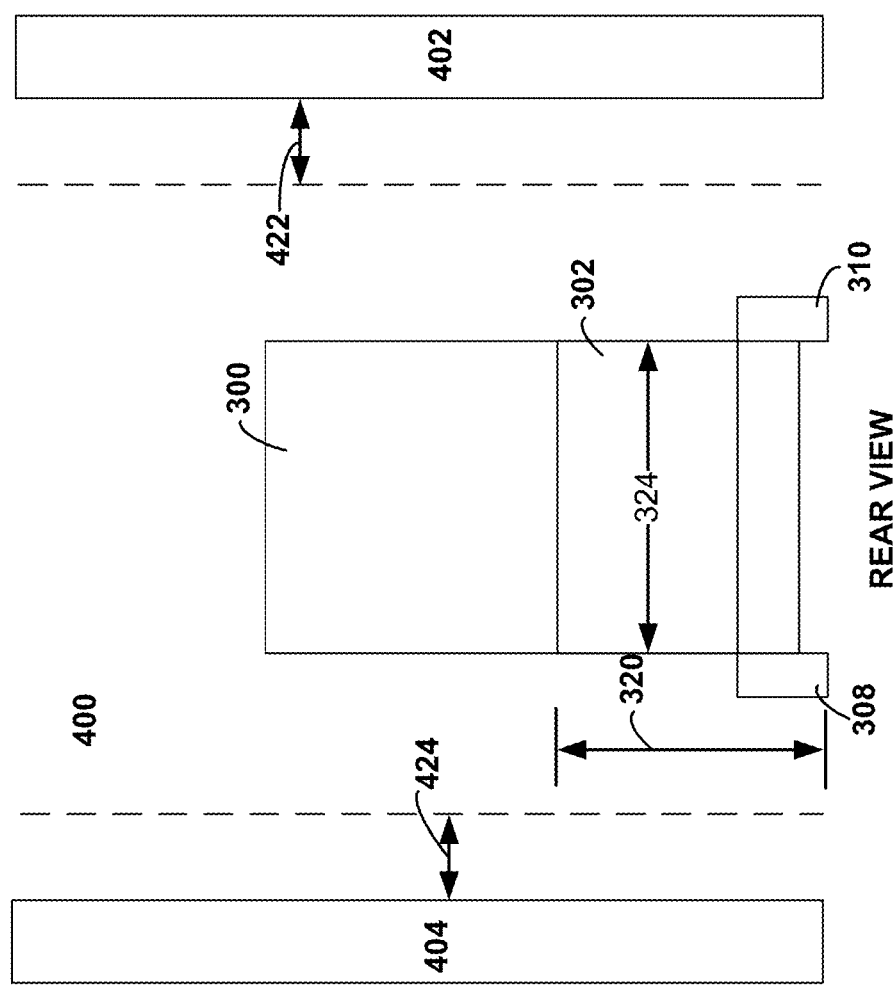

VIRTUAL MOVING SAFETY LIMITS FOR VEHICLES TRANSPORTING OBJECTS

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

Example systems and methods may provide for implementing vehicle operation limits to prevent vehicle load failures during vehicle teleoperation. In particular, example systems and methods may limit the forward velocity and angular velocity during operation of a vehicle carrying a load. Example vehicle load failures include vehicle tip over failures, load tip over failures, load slide-off failures, and collisions. For instance, tip over failures (e.g., vehicle or load tip-overs) may be prevented by preventing excessive tip-over torque generated during vehicle operation. The tip-over torque depends on the lateral acceleration of the vehicle, which is proportional to angular velocity and the square of forward velocity. Thus, by limiting forward velocity and/or angular velocity, the system can prevent excessive tip over torque from causing a vehicle load failure. The system may also provide a user interface to human operator indicating an envelope of permissible values for forward velocity and angular velocity. Permissible values of forward velocity may be expressed as a percentage of maximum velocity, while acceptable values of angular velocity may be expressed as a quantity of steering wheel turns.

In one example, a method is provided that receiving sensor data from one or more sensors on a vehicle that is controlled by a remote control system to move while carrying a load. The method may also include determining a load weight and one or more load dimensions based on the sensor data. The method may additionally include determining a forward velocity limit and an angular velocity limit for the vehicle while carrying the load, based at least in part on the load weight and the one or more load dimensions, to prevent vehicle load failure. The method may also include providing for display an indication of the forward velocity limit and the angular velocity limit on a user interface of the remote control system for the vehicle.

In an additional example, a non-transitory computer readable medium is provided that stores instructions that are executable by one or more computing devices. When the instructions are executed, the instructions cause the one or more computing devices to perform functions that receiving sensor data from one or more sensors on a vehicle that is controlled by a remote control system to move while carrying a load. The functions may also include determining a load weight and one or more load dimensions based on the sensor data. The functions may also include determining a forward velocity limit and an angular velocity limit for the vehicle while carrying the load, based at least in part on the load weight and the one or more load dimensions, to prevent vehicle load failure. The functions may also include preventing operation of the vehicle by the remote control system above the forward velocity limit and the angular velocity limit.

In another example, a system is disclosed that includes a processor and a memory that stores instructions that are executed by the processor. When executed, the instructions cause the system to perform functions that include receiving sensor data from one or more sensors on a vehicle that is controlled by a remote control system to move while carrying a load. The functions may also include determining a load weight and one or more load dimensions based on the sensor data. The functions may also include determining a forward velocity limit and an angular velocity limit for the vehicle while carrying the load, based at least in part on the load weight and the one or more load dimensions, to prevent vehicle load failure. The functions may also include providing for display an indication of the forward velocity limit and the angular velocity limit on a user interface of the remote control system for the vehicle.

In a further example, a system may include means for receiving sensor data from one or more sensors on a vehicle that is controlled by a remote control system to move while carrying a load. The system may also include means for determining a load weight and one or more load dimensions based on the sensor data. The system may additionally include means for determining a forward velocity limit and an angular velocity limit for the vehicle while carrying the load, based at least in part on the load weight and the one or more load dimensions, to prevent vehicle load failure. The system may also include means for providing for display an indication of the forward velocity limit and the angular velocity limit on a user interface of the remote control system for the vehicle.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIGS. 3A, 3B, 3C, and 3D illustrate an example vehicle carrying a load, according to an example embodiment.

FIGS. 4A and 4B illustrate an example vehicle carrying a load in an environment, according to an example embodiment.

DETAILED DESCRIPTION

Figure 1A:
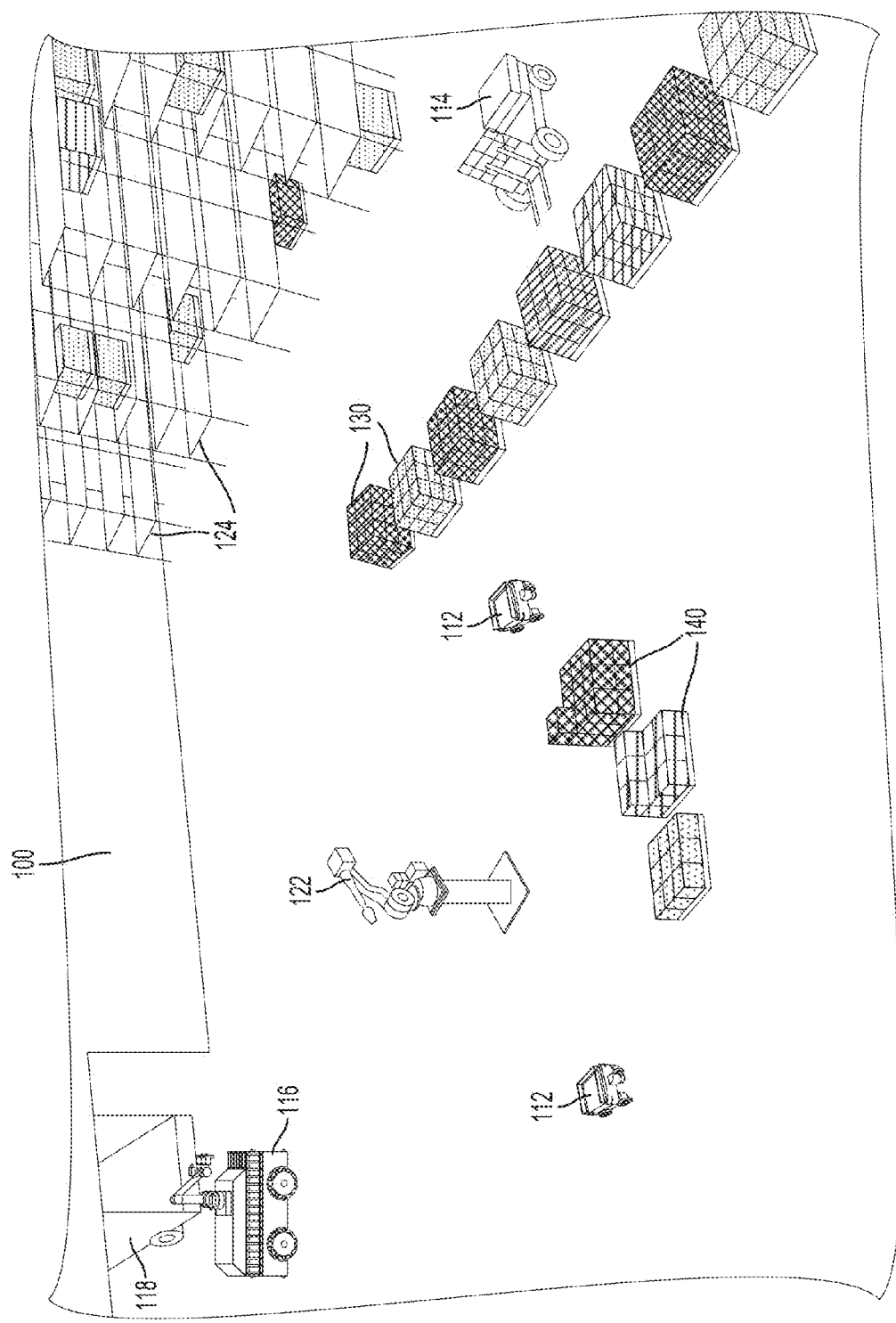
FIG. 1A shows a robotic fleet, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Assisted driving of a vehicle to move a pallet of goods (e.g., a pallet jack, a forklift, or some other vehicle) can improve the speed and efficiency of transporting pallets of goods. In particular, assisted driving of a pallet jack or forklift by a remote human user (teleoperation) could mitigate the requirement of a person being at the vehicle location and spending time driving the pallet jack or forklift. However, teleoperation of a vehicle to move pallets of goods can result in several types of failure. Different failures include collisions with the surrounding environment, tip-over failures, and/or slide-off failures. Tip-over failures include the pallet of goods tipping over or the vehicle tipping over, while slide-off failures include the pallet of goods sliding off of the vehicle. In order to maintain efficient, expedient, and safe transportation of the pallets of goods, it is important to prevent these types of failures during teleoperation of a vehicle.

However, preventing failures during teleoperation can be challenging. In particular, the load carried by the vehicle may be subject to certain dynamic constraints that prevent sharp turns and quick accelerations. During manual operation, a vehicle driver may sense that a turn or acceleration should be reduced due to a potential failure (e.g., slide-off, tip-over, collision, etc.). However, during teleoperation, sensing these dynamic constraints may pose a challenge for a remote operator.

In order to address the challenges of assisted driving of a pallet jack or forklift, a combination of sensors, cameras, and inertial measurement units can be used to compute parameters for safe teleoperation of the vehicle. These parameters include velocity and angular velocity safety limits of the vehicle. However, other parameters may also be computed for safe teleoperation of the vehicle as well or instead.

The system may rely on various control inputs to generate the parameters for safe teleoperation of the pallet jack or forklift. First, the pallet load may be measured to determine the size, weight, and weight distribution of the load. Measurement of the size and dimensions of the pallet load can be done by using laser scanners on board the vehicle. Other optical sensors may be used to further determine dimensions of the load, the vehicle, and/or the surrounding environment. In some embodiments, the dimensions of the load, the vehicle, and/or the surrounding environment are already known by the system.

Force sensors in the wheels of the vehicle can measure the weight of the load. Weight distribution of the load can be determined by the force sensors in the wheels of the vehicle by taking multiple measurements of the weight while the vehicle executes one or more turns. Based on the measurements, additional force data can be interpolated, and a weight distribution can be determined. By using onboard laser scanners and force sensors in the wheels of the vehicle, measurements about the pallet load size, weight, and weight distribution can be taken without any input from the remote human operator.

One or more inertial measurement units (IMUs) may be used to determine data about the vehicle, especially while the vehicle is in motion. The IMU may provide information about the vehicle's position, velocity, angular velocity, and/or acceleration. Some or all of this data may be provided to the human operator during teleoperation. Some or all of this data may be used to determine forward velocity and/or angular velocity safety limits.

Once the control inputs are determined, parameters for safe teleoperation can be computed. These parameters include forward velocity and angular velocity safety limits. Forward velocity indicates a distance traveled over a period of time (e.g., miles per hour, kilometers per hour, meters per second, etc.) along the direction in which the vehicle is travelling. Angular velocity describes a rate of change in angular displacement during a unit of time. The forward velocity and angular velocity safety limits are determined to prevent load failures such as tip-over failures and slide-off failures.

Forward acceleration indicates a rate of change of the forward velocity along the direction in which the vehicle is travelling. The system may also generate limits for forward acceleration to prevent vehicle load failures, such as tip-over failures and slide-off failures.

Lateral acceleration describes a rate of change in velocity along a direction that is perpendicular to the direction of travel of the vehicle. Lateral acceleration may be used to calculate pertinent values (e.g., tip-over torque, force of the pallet on the vehicle, etc.) for preventing vehicle load failures (e.g., tip-over failures, slide-off failures, etc.). Lateral acceleration is equal to forward velocity multiplied by angular velocity.

Tip-over torque represents the amount of torque generated for an object due to acceleration of the object. If the tip-over torque for an object becomes excessive due to a large acceleration (or deceleration), the object may tip over due to a high tip-over torque (i.e., tip-over failure). Thus, a vehicle tip-over torque is the amount of torque generated for a vehicle due to acceleration of the vehicle while the vehicle is carrying a load. Similarly, the load tip-over torque is the amount of torque generated for the load due to acceleration of the load.

Tip-over torque is equal to a lateral acceleration multiplied by the mass multiplied by the height of the load (e.g., pallet of goods) above the ground. For the vehicle tip-over torque, the total mass of the vehicle and the load is used, whereas for the load tip-over torque, only the mass of the load is used. Tip-over torque may be used to determine forward velocity and forward acceleration limits to prevent excessive torque that may cause tip-over failures (e.g., vehicle tip-over, load tip-over).

Tip-over torque may vary based on center of mass location. For example, an acceleration of an object with a higher center of mass location will generate a higher tip-over torque than the same acceleration of an object with a lower center of mass location (assuming both objects have the same mass). As a result, an object with a higher center of mass location will have lower forward velocity and/or angular velocity limits than an object with a lower center of mass to prevent tip-over failures (assuming both objects have the same mass).

The height of the load above the ground is used as a conservative estimate of the center of mass location for the load, as well as the vehicle including the load. An estimate may be used because calculating the center of mass location may be impossible or inefficient. Other methods for estimating the center of mass location are also possible. For example, the height of the load above the ground may be used as a first estimate for the center of mass location. The center of mass location may then be revised to a more accurate estimate due to additional information becoming available. This estimate update process may then be iterated multiple times to continue improving the accuracy of the center of mass location estimate. In some cases, the center of mass location may be calculated while determining weight distribution.

In order to prevent slide-off failures, the force of the load on the vehicle may be determined. This can be determined by multiplying the calculated lateral acceleration by the mass of the load. Based on the calculated force, the forward velocity and/or angular velocity can be limited to prevent a slide-off failure. In particular, for sharp turns or sudden maneuvers, the pallet can slide-off the vehicle if the vehicle velocity is too fast. Thus, forward velocity and angular velocity limits can also be calculated to help prevent slide-off failures for the vehicle.

As mentioned earlier, angular velocity describes a rate of change in angular displacement during a unit of time (i.e., rotational speed in a particular direction). Thus, angular velocity typically applies when the vehicle is turning. During a turn, the vehicle may travel along an arc that can be defined by an origin and a radius. During the turn, the angular velocity may equal the forward velocity divided by the radius. Thus, when a vehicle traveling at a constant forward velocity makes a sharper turn (i.e., smaller turning radius), the angular velocity is larger than the angular velocity for a larger turn (i.e., bigger radius). The larger angular velocity from a sharper turn results in a larger lateral acceleration, which then generates a bigger tip-over torque for the vehicle and the load, along with a larger load force on the vehicle. Thus, tip-over failures and slide-off failures can be reduced by limiting angular velocity. One way to limit angular velocity is to control the radius of the turn by limiting the number of permissible steering wheel turns by the driver. Further, a slower forward velocity may also reduce angular velocity. Other methods for limiting angular velocity may also be possible.

In order to prevent collisions with surrounding environments, minimum distances between the objects in the environment (e.g., other pallets, humans, walls, ceilings) and the vehicle can be specified. Minimum distance collision limits may also help to determine a maximum velocity in a particular collision environment. For example, the maximum safe velocity may be a function of the maximum safe acceleration (or deceleration) and the minimum distance between the vehicle and an object in the surrounding environment.

In some embodiments, multiple maximum safe velocities may be calculated for a vehicle. For example, a vehicle may have a first object at a first location in a first direction (e.g., to the left of the vehicle) and a second object at a closer second location in a second direction (e.g., to the right of the vehicle). As a result, the forward velocity limit in the first direction may be higher than the forward velocity limit in the second direction due to the different object locations.

Other velocity or acceleration limits are also possible to encourage safe teleoperation of the vehicle. In particular, for regions that are not in view of the vehicle's cameras, these regions may be considered "unknown" areas. One system policy may prohibit the vehicle from traveling through "unknown" areas to prevent collisions. Alternatively, a policy could require that lower forward velocity and/or acceleration limits for the vehicle be implemented when the vehicle is traveling through "unknown" areas.

After receiving control inputs from various sensors and devices, the forward velocity and angular velocity limits may be calculated by forward simulation. The simulation may factor in the size, weight, and weight distribution of the vehicle, the size, weight, and weight distribution of the load, and the layout of the surrounding environment. The simulation may determine a tip-over torque that may lead to a tip-over failure. Based on this determination, limits for the forward velocity and/or angular velocity can be determined to prevent tip-over failures. Additionally, the simulation may determine a force that would cause a slide-off failure. Based on this slide-off force determination, limits for forward velocity and angular velocity can also be determined to prevent slide-off failures.

A remote human driver may operate the vehicle by using a human machine interface (HMI). The HMI may include a display that provides the forward velocity limit to the driver. The forward velocity limit may be expressed on the display as a fraction or percentage of the maximum forward velocity possible. For example, a forward velocity limit at a particular time may be expressed as 25% of the maximum forward velocity. The HMI may also provide an indication of the current forward velocity via the display. Thus, the remote human user can determine if their current forward velocity exceeds or is about to exceed a forward velocity safety limit.

The HMI may also provide information to the remote human operator via the display about angular velocity and turning the vehicle. The HMI may implement an angular velocity limit by indicating a maximum amount the vehicle can be turned left or right via the display. The HMI may indicate the maximum amount by indicating a number of permissible steering wheel turns by the human operator in either direction. The HMI may also indicate to the remote human operator whether the operator is within the limits for turning, is close to the limit for turning, or has exceeded the limit. If the operator has exceeded the limit, his turn may be disallowed or reduced.

In some embodiments, the HMI may warn the human operator during teleoperation that a human operator's vehicle velocity or angular velocity exceeds or is about to exceed the forward velocity or angular velocity limit. The HMI may provide an audible warning (e.g., a buzzer, an alarm, a tone, etc.) when a limit is exceeded or about to be exceeded. Alternatively, in some embodiments, the HMI may limit forward velocities and/or angular velocities of the vehicle during teleoperation to the calculated forward velocity and/or angular velocity limits. For example, if the calculated velocity limit is 25% of the maximum forward velocity, and the human operator attempts to drive the vehicle at 30% of the maximum forward velocity, the HMI may override the human operator's forward velocity attempt and force the vehicle to drive at no more than 25% of the maximum forward velocity. In some embodiments, the human operator may be allowed to override the HMI to exceed the calculated forward velocity and/or angular velocity limits. The HMI may also display an envelope of possible values for one or more parameters, including forward velocity and angular velocity. Displaying an envelope of possible values may enable a remote operator to make better decisions to prevent vehicle load failures during teleoperation of the vehicle.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading and/or unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
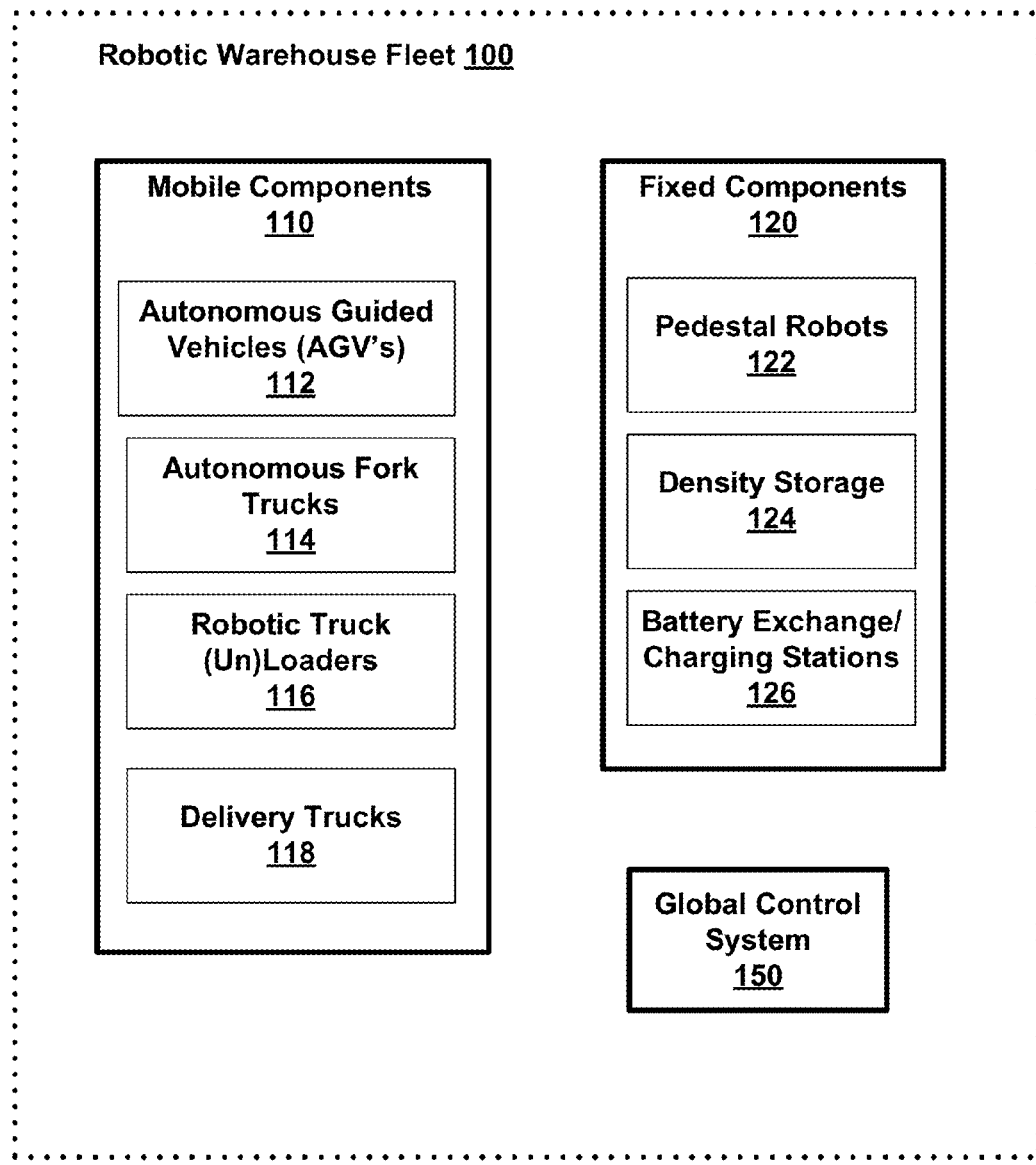
FIG. 1B is a functional block diagram illustrating components of a robotic fleet, according to an example embodiment.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A-2D illustrate several examples of robotic devices that may be included within a robotic warehouse fleet. Other robotic devices which vary in form from those illustrated here as well as other types of robotic devices may also be included.

Figure 2A:
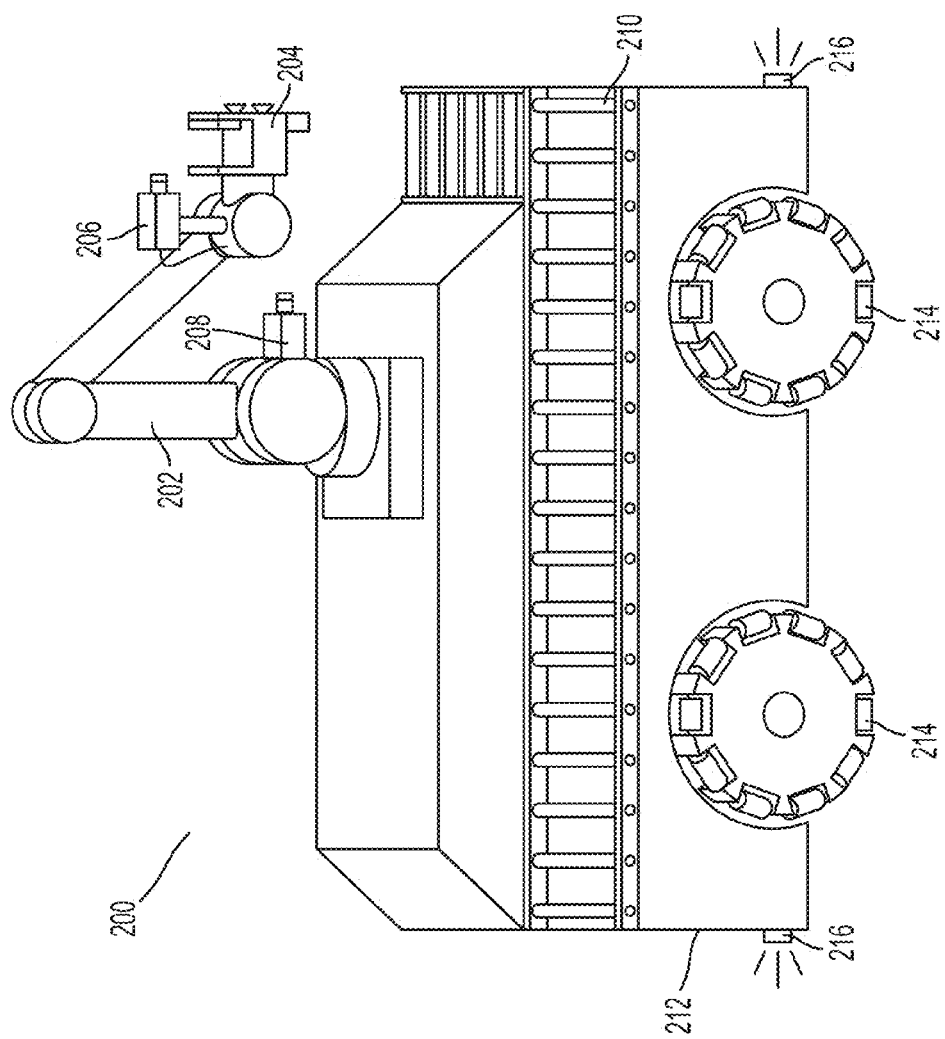
FIG. 2A shows a robotic truck unloader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 may be holonomic wheels that allow the cart 212 to move with two degrees of freedom. Additionally, a wrap around front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a front navigation sensor 216 and a rear navigation sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 2B:
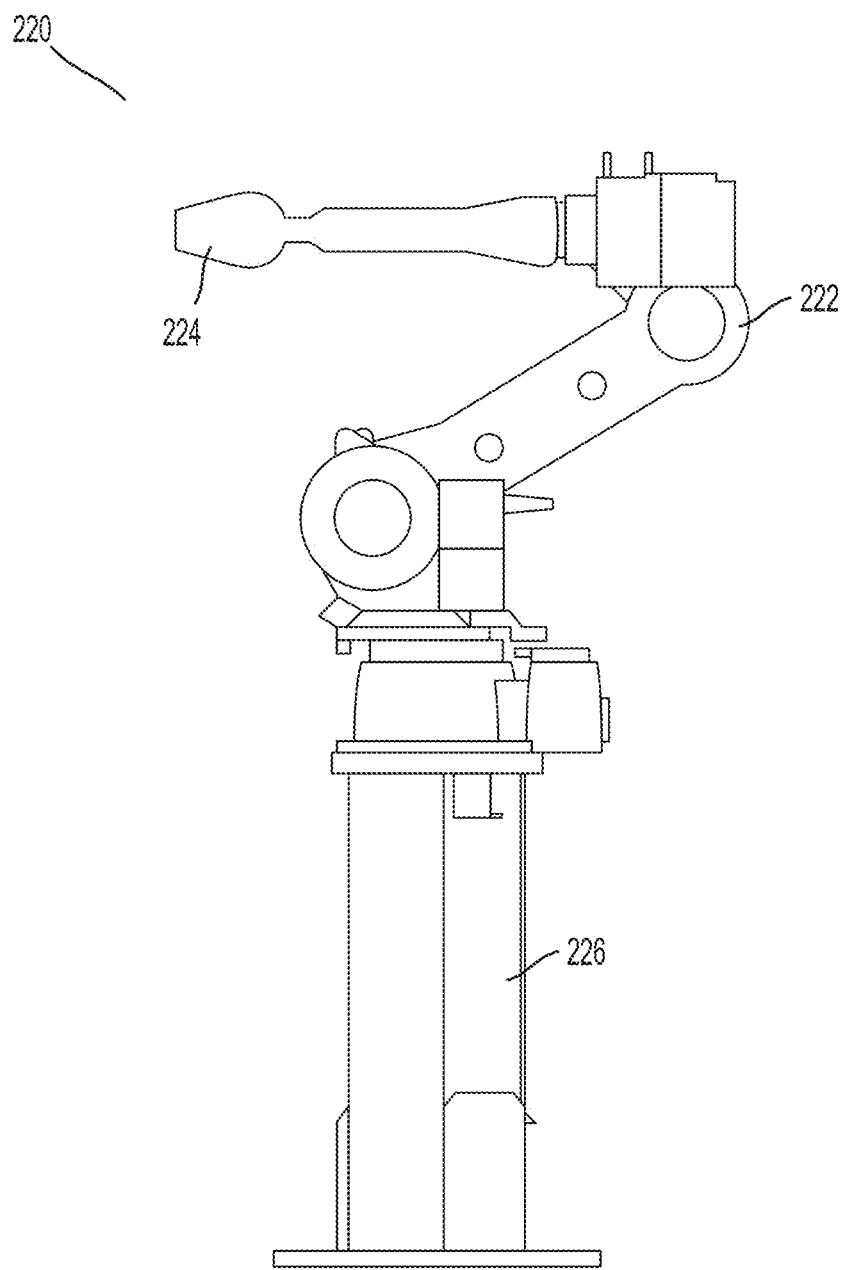
FIG. 2B shows a robotic arm on a pedestal, according to an example embodiment.

FIG. 2B illustrates a robotic arm on a pedestal, according to an example embodiment. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In additional examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
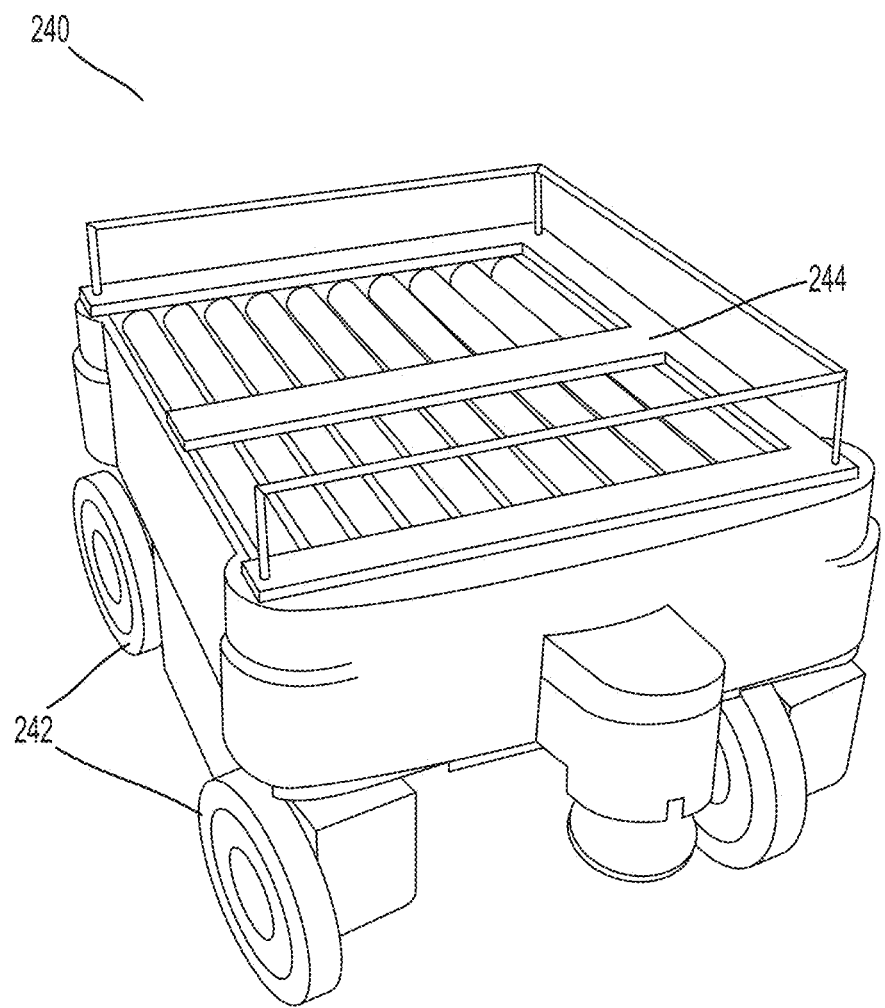
FIG. 2C shows an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
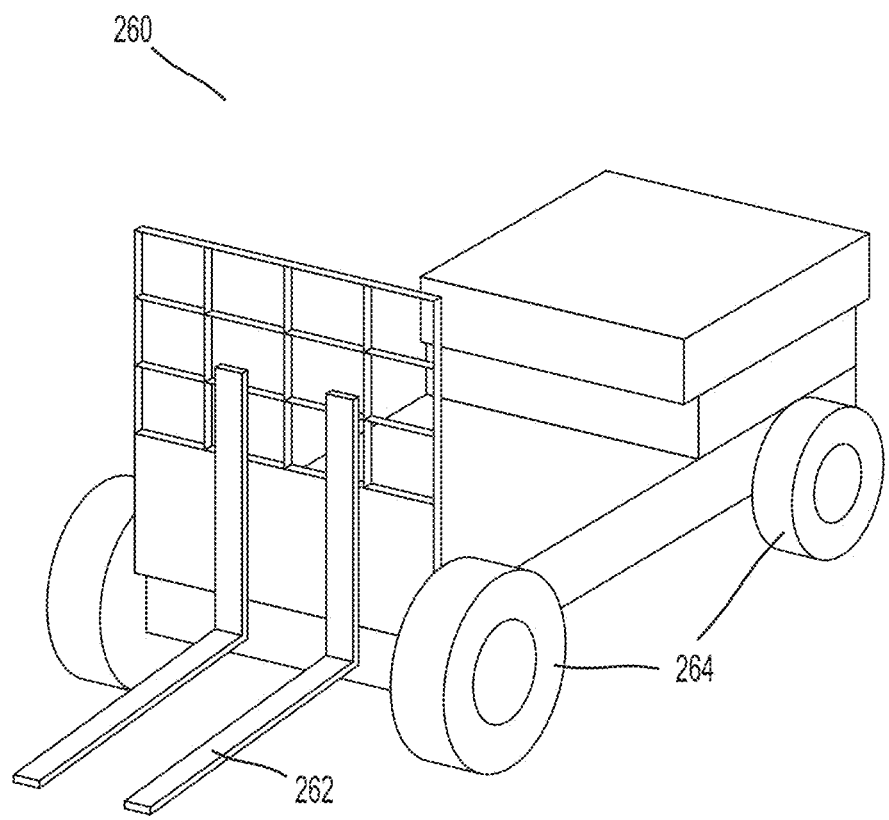
FIG. 2D shows an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

Figure 3A:
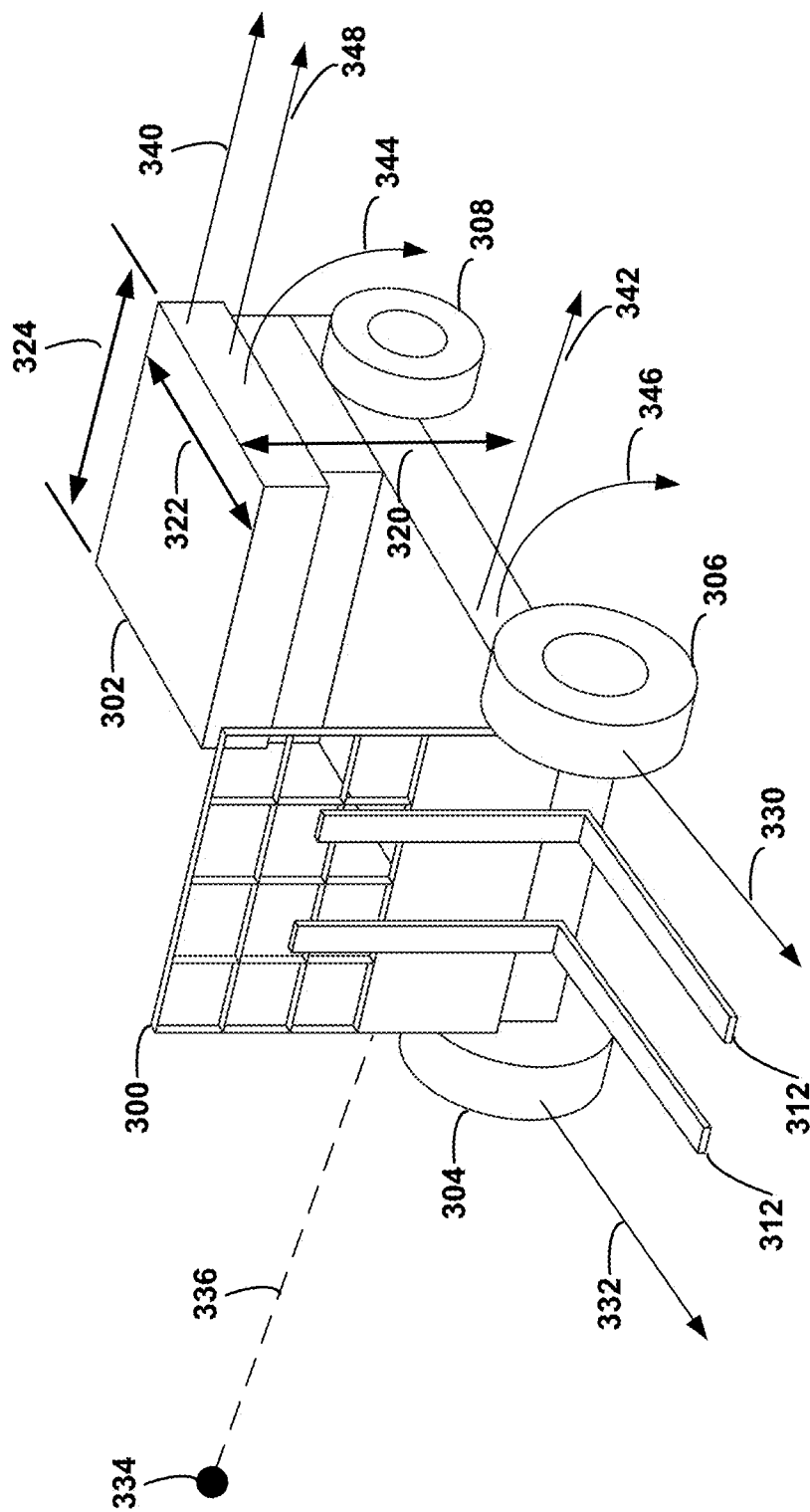
Figure 3B:
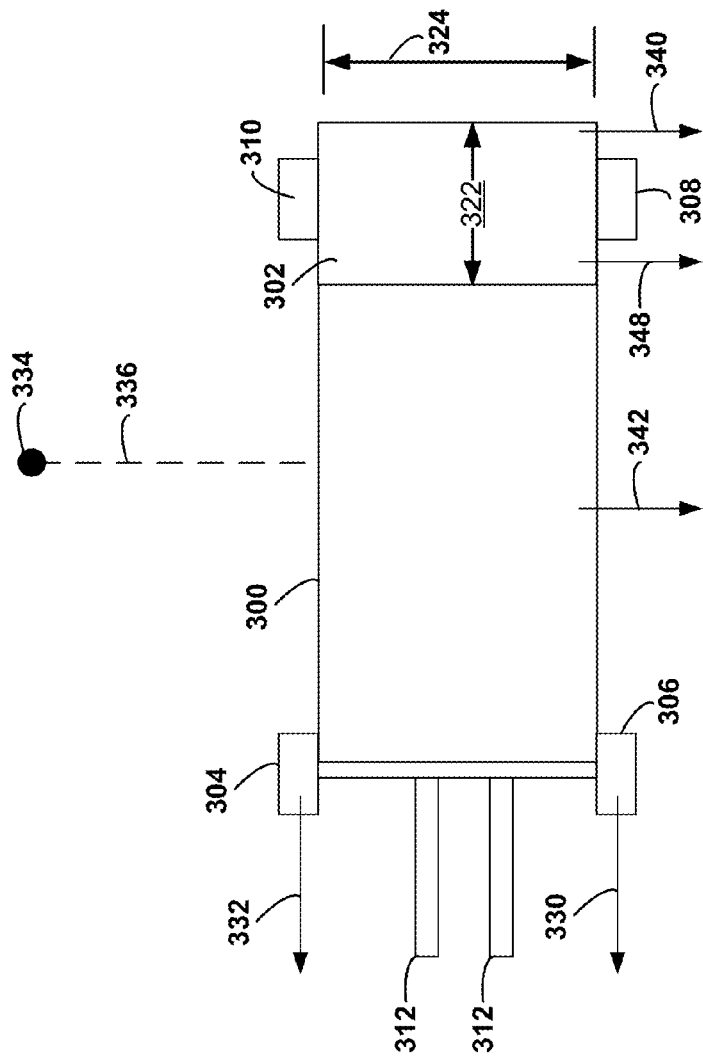

FIGS. 3A-3C display an example of a vehicle carrying a load. More specifically, FIGS. 3A-3C display a vehicle 300 carrying a load 302 while the vehicle 300 makes a right turn around an origin 334. The vehicle 300 includes a first wheel 304, a second wheel 306, a third wheel 308, and a fourth wheel 310. FIG. 3A is a perspective view of the vehicle 300 showing the first wheel 304, the second wheel 306, and the third wheel 308. FIG. 3B is a top view of the vehicle 300 in which all four wheels (e.g., 304, 306, 308, and 310) are shown. FIG. 3C is a rear view of the vehicle 300, in which only wheels 308 and 310 are shown.

The vehicle 300 may be any of the mobile robots described in FIGS. 1A-1B and 2A-2D, including mobile components 110, autonomous guided vehicles 112, autonomous fork trucks 114, robotic truck loaders or unloaders 116, and/or other mobile robots. Alternatively, the vehicle 300 may be a different type of vehicle that is not described in FIGS. 1A-1B and 2A-2D. In the displayed embodiment of FIGS. 1A-1B and 2A-2D, the vehicle 300 is similar to the autonomous fork truck 260 described in FIG. 2D.

FIGS. 1A-1B and 2A-2D display a load 302 which is transported by the vehicle 300. The load 302 may be one or more objects that can be described by a load weight and load dimensions. Load dimensions may include a load height 320, a load length 322, and a load width 324. Other load dimensions may also be possible. The load 302 may be one or more boxes, a pallet of objects (e.g., goods, boxes, or other objects), or some other object that can be described by a load weight and load dimensions. The vehicle 300 may transport a load 302 without requiring a human at the vehicle location to drive the vehicle. In particular, a remote user may teleoperate the vehicle 300 while the vehicle 300 carries a load 302. Alternatively, the vehicle 300 may be capable of autonomously transporting a load 302 without human intervention and/or human assistance. Further, the vehicle 300 may operate autonomously or be remotely operated by a human without carrying a load 302.

A remote user may rely on a remote control system for remote teleoperation of the vehicle 300. The remote control system may be similar to, or the same as, global control system 150 displayed in FIG. 1B. Alternatively, the remote control system may be part of the global control system 150. In another alternative, the remote control system may be separate from the global control system 150. The remote control system may be located in the same environment as the vehicle (e.g., a warehouse). Alternatively, parts or all of the remote control system may be located at a remote location from the vehicle 300.

The remote control system may communicate with the vehicle 300 by way of a communication network. The communication network may enable the system to provide control inputs to the vehicle 300. In addition, the communication network may allow the vehicle 300 to provide sensor data to the remote control system. The system may determine the control inputs for the vehicle 300 based on the received sensor data. The communication network may be a wired or wireless network. Alternatively, the communication network may include a combination of one or more wired or wireless networks.

During teleoperation of the vehicle 300 by a remote user of the remote control system, the vehicle 300 may suffer a vehicle load failure while carrying a load 302. A vehicle load failure occurs when the vehicle 300, while carrying the load 302, experiences an event that prevents or inhibits the vehicle 300 from transporting the load 302 as intended. Examples of vehicle load failures include a vehicle tip-over failure, a load tip-over failure, a load slide-off failure, or a collision by the vehicle 300 or load 302 with the surrounding environment. However, other types of vehicle load failures may also be possible.

A vehicle tip-over failure occurs when the vehicle 300 tips over while the vehicle is carrying the load 302. A load tip-over failure happens when some, or all, of the load 302 tips over while the vehicle 300 is in operation carrying the load 302. In some cases, some, or all, of the load 302 may tip over off of the vehicle 300. A load slide-off failure takes place when some, or all, of the load 302 slides off of the vehicle 300 while the vehicle 300 is carrying the load 302. A collision failure happens when the vehicle 300 and/or the load 302 collides with one or more objects of the surrounding environment.

A vehicle load failure may also occur as a result of the vehicle carrying the load 302. For example, a vehicle load failure may take place when the vehicle 300, while carrying the load 302, comes to an immediate stop. In this case, a large deceleration by the vehicle may cause the load 302 to slide off of the vehicle 300, resulting in a slide-off failure. Alternatively, the load 302 may tip over off the vehicle 300 (i.e., load tip-over failure) as a result of the large deceleration by the vehicle 300. In some cases, even the vehicle 300 may tip over because of a large deceleration, which would thus result in a vehicle tip-over failure.

For teleoperation of the vehicle 300, sensor data may be provided by the vehicle 300 from one or more types of sensors to the remote control system. Types of sensors include force sensors, laser scanners, cameras, inertial measurement units, and/or other sensors that provide sensor data to the remote control system. The sensor data may be provided by the vehicle 300 to the remote control system by way of the communication network. The remote control system may then use the sensor data to determine control inputs for the vehicle 300.

The vehicle 300 may determine the load weight of load 302 by using force sensors located in the wheels of the vehicle 300. The force sensors may be located in one or more of the wheels 304, 306, 308, and/or 310 of the vehicle 300. Alternatively, the force sensors may be located in a different part of the vehicle to measure the weight of the load. For example, force sensors could be located in the forks 312 of vehicle 300 to measure the weight of the load 302. Other locations for the force sensors are also possible.

The force sensors may also be used to determine the weight distribution of the load 302. In particular, the vehicle 300 may execute one or more turns while carrying the load 302 to obtain data used to determine the weight distribution of the load 302. The data may be obtained by taking multiple measurements with the vehicle wheel force sensors during the one or more turns of the vehicle 300. Based on these measurements, additional force data can be interpolated, and weight distribution may then be determined.

The vehicle 300 may also determine load dimensions for load 302 without human assistance or human intervention. The vehicle 300 may use onboard laser scanners to determine the load dimensions of the load 300. In particular, the onboard laser scanners may be used to determine a load height 320, a load length 322, and/or a load width 324. As can be seen in FIGS. 3A-3C, the load height 320 is a measurement from the top of the load to the ground. Other load dimensions may also be obtained using the onboard laser scanners. Additionally, other sensors, whether on board the vehicle, or located elsewhere, may be used to obtain data about the load 302.

One or more cameras may also be onboard the vehicle 300 to obtain data about the load 302, along with the surrounding environment. Cameras onboard the vehicle 300 may be used to identify one or more boxes, or parts, of the load 302. Additionally, vehicle cameras may be used to identify and/or gather information about the surrounding environment. For example, the vehicle 300 may rely on cameras onboard the vehicle to determine one or more distances between the vehicle 300 and one or more objects in the surrounding environment. Other data may also be obtained from cameras onboard the vehicle 300 and provided to the remote control system.

The vehicle 300 may also include one or more inertial measurement units (IMUs) to determine data about the vehicle 300 and/or the load 302 while the vehicle 300 carries the load 302. An IMU may provide data about the vehicle's position, forward velocity, angular velocity, forward acceleration, lateral acceleration, and/or other values. By using various types of sensors onboard the vehicle 300 to collect sensor data for transmission to a remote control system, human intervention and assistance can be reduced for teleoperation of the vehicle 300 carrying a load 302.

In the displayed embodiment of FIGS. 3A-3C, the vehicle travels at a forward velocity 330. The forward velocity describes an amount of distance traveled by vehicle 300 during a unit of time. For example, the forward velocity 330 may be expressed in meters per second, kilometers per hour, miles per hour, or some other unit. In some cases, the direction of the forward velocity is the same as the direction of travel of the vehicle 300, which is shown by the arrow for forward velocity 330.

The vehicle may also have a forward acceleration 332. A forward acceleration describes a change in the forward velocity 330 during a unit of time. For example, the forward acceleration 332 may be expressed in meters per second per second, kilometers per hour per second, miles per hour per second, or some other unit. In the displayed embodiment of FIG. 3A, the forward acceleration 332 occurs in the same direction as the forward velocity 330, which is along the direction of travel of the vehicle 300. Alternatively, the vehicle 300 may decelerate, which would be a negative value for forward acceleration 332. In this case, the direction of the deceleration would be opposite to the direction of travel of the vehicle 300.

In FIGS. 3A-3C, the vehicle 300 takes a right turn that can be defined by origin 334 and radius 336. In particular, the path of the right turn of vehicle 300 may equal an arc of a circle defined by origin 334 and radius 336. The origin 334 is the center of the circle, while the radius 336 is the distance between the origin 334, and any point along the circumference of the circle. Thus, at any point along the arc of the right turn of vehicle 300, the distance between the vehicle 300 and the origin 334 may equal the length of the radius 336.

FIG. 3D displays a top view of the vehicle 300 making the right turn around origin 334. In particular, FIG. 3D displays the vehicle 300 in a first position 300A and a second position 300B. As the vehicle 300 progresses through the right turn, the vehicle travels from the first position 300A to the second position 300B. At the first position 300A, the distance between the vehicle 300 and the origin 334 equals the length of the radius 336A. At the second position 300B, the distance between the vehicle 300 and the origin 334 equals the length of the radius 336B, which also equals the length of the radius of 336A. In some embodiments, the length of the radius 336 equals the lengths of the radii 336A and 336B.

While the vehicle 300 executes a right turn, the vehicle 300 may travel with an angular velocity. Angular velocity describes a rate of change in angular displacement during a unit of time (i.e., rotational speed). In FIG. 3D, the angular displacement of the angular velocity of the vehicle 300 may be represented by angle 338. In particular, if the amount of time it takes for the vehicle 300 to travel from first position 300A to second position 300B is one second, then the angular velocity of the vehicle 300 would equal the angular displacement 338 per second.

Angular velocity may also equal the forward velocity 330 (see FIGS. 3A-3C) divided by the radius 336. As a result, angular velocity can be increased or decreased by increasing or decreasing the forward velocity 330. Alternatively angular velocity can be increased or decreased by increasing or decreasing radius 336. In particular, a decreased radius 336 would indicate that vehicle 300 is making a sharper right turn around the origin 334. Alternatively, a larger radius 336 indicates that the vehicle 300 is making a wider right turn around the origin 334. Other methods for altering angular velocity may also be possible.

As seen in the displayed embodiments of FIGS. 3A-3C, the load 302 may have a lateral acceleration 340 in response to the vehicle making a right turn. Additionally, the vehicle 300 may also have a lateral acceleration 342 in response to the vehicle 300 making a right turn. Lateral acceleration describes a rate of change in velocity during a unit of time. Similar to forward acceleration 332, lateral acceleration may be expressed in meters per second per second, kilometers per hour per second, miles per hour per second, or some other unit. In the displayed embodiment of FIGS. 3A-3C, the lateral acceleration 340 and lateral acceleration 342 are along a direction perpendicular to the direction of travel of the vehicle.

Lateral acceleration is equal to forward velocity multiplied by angular velocity. Thus, an increase in angular velocity (e.g., due to a sharper turn or an increased forward velocity) may increase the lateral acceleration 340 and/or 342. Because angular velocity equals forward velocity divided by the radius, lateral acceleration may also equal the square of forward velocity divided by the radius. Thus, an increase in forward velocity 330 may also increase lateral acceleration 340 and 342.

Lateral acceleration 340 may be the same value or a different value from lateral acceleration 342. For example, if the vehicle 300 and load 302 tip over together during the turn, the lateral accelerations 340 and 342 may be the same value. However, if during a right turn of vehicle 300 only load 302 tips over, then lateral acceleration 340 will be a different value from lateral acceleration 342. In this case, lateral acceleration 340 will be larger than lateral acceleration 342. Lateral accelerations 340 and 342 may be used to calculate pertinent values (e.g., tip-over torque, force of the pallet on the vehicle, etc.) for preventing vehicle load failures (e.g., tip-over failures, slide-off failures, etc.).

In the displayed embodiment of FIGS. 3A-3C, the right turn of the vehicle 300 may cause a load tip-over torque 344 and a vehicle tip-over torque 346. Tip-over torque represents the amount of torque generated for an object due to acceleration of the object. If the tip-over torque for an object becomes excessive, the object may tip over. The vehicle tip-over torque 346 and the load tip-over torque 344 may be the same or different values.

In the displayed embodiment, tip-over torque is equal to lateral acceleration multiplied by the mass of the object multiplied by the load height. Thus, vehicle tip-over torque 346 equals the total mass of the vehicle 300 and the load 302 multiplied by load height 320 multiplied by lateral acceleration 342. Similarly, load tip-over torque 344 equals the load mass multiplied by the load lateral acceleration 340 multiplied by the load height 320. However, other methods for calculating the tip-over torque are also possible.

For example, while the displayed embodiment of FIGS. 3A-3C described tip-over failures happening during a right turn by the vehicle, a load tip-over failure could also happen due to a sudden forward acceleration 332 by vehicle 300 while traveling in a straight line. In this case, the tip-over torque direction would cause the load 302 to tip over backwards off of the vehicle. In this case, the load tip-over torque would depend on the mass of the load 302, the forward acceleration 332, and the load height 320. Tip-over torque values (e.g., load tip-over torque 344, vehicle tip-over torque 346) can be used to determine vehicle operation limits (e.g., forward velocity limit, angular velocity limit, forward acceleration limit, etc.) to prevent vehicle load failures, such as tip-over failures.

Tip-over torque for an object may vary based on the location of the center of mass for the object. In particular, a higher center of mass may generate a larger tip-over torque. However, determining the center of mass of the vehicle 300 and/or the load 302 may be inefficient, impractical, or even impossible. As a result, the calculation of tip-over torque relies on an estimation of the center of mass location. For example, the center of mass location may be estimated conservatively by using the load height 320.

In some embodiments, the center of mass location estimate may be iteratively updated as additional sensor data is received. For example, an initial estimate of the center of mass location may be the load height 320. Next, additional sensor data from the force sensors in the wheels may be obtained regarding the weight distribution of the load 302. This additional data may then be used to update the center of mass location estimate to a value more accurate than the load height 320. This process may then be iterated multiple times to continue improving the accuracy of the center mass location estimate. However, other methods of estimating the center of mass location may also be used.

In the displayed embodiment of FIGS. 3A-3C, the force of the load on the vehicle 348 may be determined to prevent slide-off failures. In particular, an excessive load force 348 may cause the load 302 to slide off the vehicle 300 while the vehicle 300 takes a right turn, as shown in FIGS. 3A-3C The load force 348 may equal the lateral acceleration 340 multiplied by the load mass. The load force 348 may be used to help prevent vehicle load failures, such as load slide-off failures.

Vehicle load failures can be prevented by implementing limits during vehicle operation. For example, the forward velocity 330, forward acceleration 332, and/or angular velocity can be limited for a vehicle 300 to prevent vehicle load failures (e.g., tip-over failures, slide-off failures, collisions, etc.). A forward velocity limit can be used to prevent the forward velocity 330 from exceeding a certain speed. Similarly, an angular velocity limit may also be used to prevent the vehicle 300 from exceeding a certain angular displacement during a unit of time (e.g., per second).

Forward velocity limits and angular velocity limits are effective at preventing vehicle load failures because the limits prevent excessive tip-over torques 344 and 346 and/or excessive load forces 348 from being generated. As mentioned earlier, tip-over torques 344 and 346 and load force 348 are calculated based on lateral accelerations 340 and 342, which are proportional to angular velocity and the square of forward velocity 330 of the vehicle 300. Thus, forward velocity limits and angular velocity limits reduce tip-over torques 344 and 346 and load force 348, which in turn prevents tip-over failures and slide-off failures.

Forward simulation may be used to calculate limits for vehicle operation. In particular, forward simulation using sensor data obtained by the remote control system can determine potential tip-over torque values 344 and 346 and load force values 348 for different pairs of forward velocity values 330 and angular velocity values of the vehicle 300. Based on this forward simulation, the remote control system can then determine permissible values of forward velocity 330 and angular velocity of the vehicle 300. In some cases, the system may determine permissible pairs of values of forward velocity 330 and angular velocity of the vehicle 300. Based on the determination of permitted values, the system can then determine and implement a forward velocity limit and an angular velocity limit. Further, the system may determine other limits for vehicle operation (e.g., forward acceleration limit).

Another possible vehicle load failure that the remote control system can prevent by gathering sensor data from the vehicle is collisions. In particular, the system can prevent a vehicle from colliding with one or more objects in a surrounding environment. Additionally, the system can prevent the load carried by the vehicle from colliding with one or more objects in the surrounding environment.

Figure 4A:
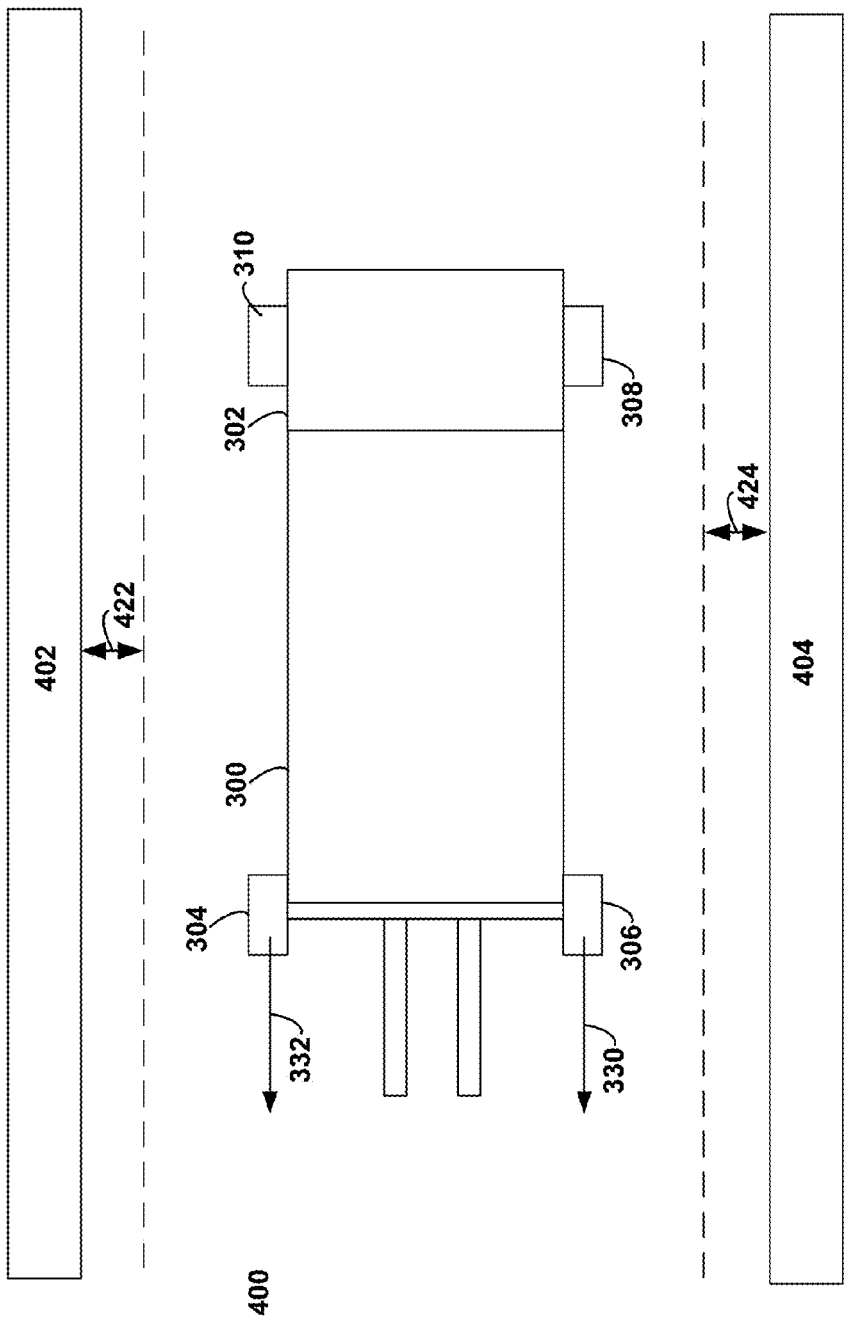

FIGS. 4A and 4B display an embodiment of the vehicle 300 traveling through a surrounding environment 400. FIG. 4A is a top view of the vehicle 300 while FIG. 4B is a rear view of the vehicle 300. Thus, in FIG. 4A, all four wheels of the vehicle are visible (304, 306, 308, and 310) whereas in FIG. 4B, only the rear wheels 308 and 310 can be seen. The vehicle 300 travels through the environment 400 at a forward velocity of 330. The vehicle 300 may accelerate at a forward acceleration of 332. The surrounding environment 400 includes a first shelf 402 and a second shelf 404. In the displayed embodiment, the shelves 402 and 404 may be stationary objects of the surrounding environment 400. However, other objects are possible in environment 400.

The remote control system may prevent a vehicle collision failure by maintaining a set of one or more minimum distances between the vehicle and the one or more objects of the surrounding environment. For example, in FIGS. 4A and 4B, the system may prevent the vehicle 300 from colliding with the objects of surrounding environment 400 by maintaining a minimum distance between the vehicle 300 and the objects 402 and 404. In particular, the vehicle 300 may be required to remain at least a distance 422 away from shelf 402. Additionally, the vehicle 300 may be required to maintain at least a distance 424 away from shelf 404. The distances 422 and 424 may be the same or different values. The system may prevent vehicle collisions by implementing a forward velocity limit and/or a forward acceleration limit. Other limits may also be implemented.

The remote control system may implement vehicle operation limits to prevent collisions based on the set of one or more minimum distances that the vehicle should maintain with the one or more objects in the surrounding environment. For example, a forward velocity limit may be a function of a maximum acceleration (or deceleration) and the minimum distance between the vehicle 300 and an object in the surrounding environment. Thus, the vehicle 300 may have a forward velocity limit determined based on the distance 422 and the maximum acceleration of vehicle 300 to prevent a collision between the vehicle 300 and the object 402.

In some embodiments, the vehicle 300 may have different forward velocity limits for different objects. For example, the maximum forward velocity limit for vehicle 300 with respect to object 402 may be different from the maximum forward velocity limit 300 with respect to object 404. In this example, the distance 422 may be smaller than the distance 424. Thus, if the vehicle is an equal distance from both objects 402 and 404, the forward velocity limit for vehicle 300 with respect to object 402 may be larger than the forward velocity limit for vehicle 300 with respect to object 404. This disparity in forward velocity limits is due to the minimum distance 422 being smaller than the minimum distance 424.

Alternatively, the system may limit vehicle operation to prevent collisions between the load 302 and one or more of the objects of environment 400. The remote control system may monitor the load dimensions, including load height 320 and load width 324. For example, if load height 320 is larger than the height of the vehicle, and the load would not achieve vertical clearance in certain areas of the surrounding environment 400, the vehicle 300 may then be restricted from entering those areas to prevent a collision between the load 302 and the surrounding environment 400. Other examples of preventing collisions between load 302 and the surrounding environment 400 are also possible.

The surrounding environment 400 may include objects that have not been mapped by the remote control system. Areas of the surrounding environment that include one or more unmapped objects by the remote control system may be considered "unknown areas." The remote control system may implement one or more different policies for the vehicle during navigation through an unknown area. For example, the vehicle 300 may have lower limits on forward velocity, angular velocity, and/or forward acceleration when the vehicle travels through an unknown area. Alternatively, the system may bar navigation by the vehicle 300 through an unknown area. These policies may be determined to further prevent collisions between the surrounding environment 400 and the vehicle 300 or the load 302.

Alternatively, the remote control system may not implement a policy for the vehicle 300 when it encounters an "unknown area." Further, the vehicle 300 may use one or more onboard sensors, such as cameras, to obtain data about one or more unmapped objects in the unknown area. In some cases, enough data may be obtained such that the one or more objects can be mapped, which may then convert the unknown area to a known area. However, other system policies for vehicle operation and an "unknown area" are also possible.

As mentioned earlier, forward simulation can be used to determine forward velocity limits, angular velocity limits, and/or forward acceleration limits of the vehicle 300 to prevent vehicle load failures. In FIGS. 4A and 4B, forward simulation may be used to determine forward velocity limits, angular velocity limits, and/or forward acceleration limits to ensure that vehicle 300 maintains a set of one or more minimum distances (e.g., 422 and 424) between the vehicle 300 and the objects 402 and 404 of the surrounding environment 400. Furthermore, forward simulation may be used to generate limits and/or restrict vehicle navigation in certain areas to prevent collisions between the load 302 and objects in the surrounding environment.

Figure 5A:
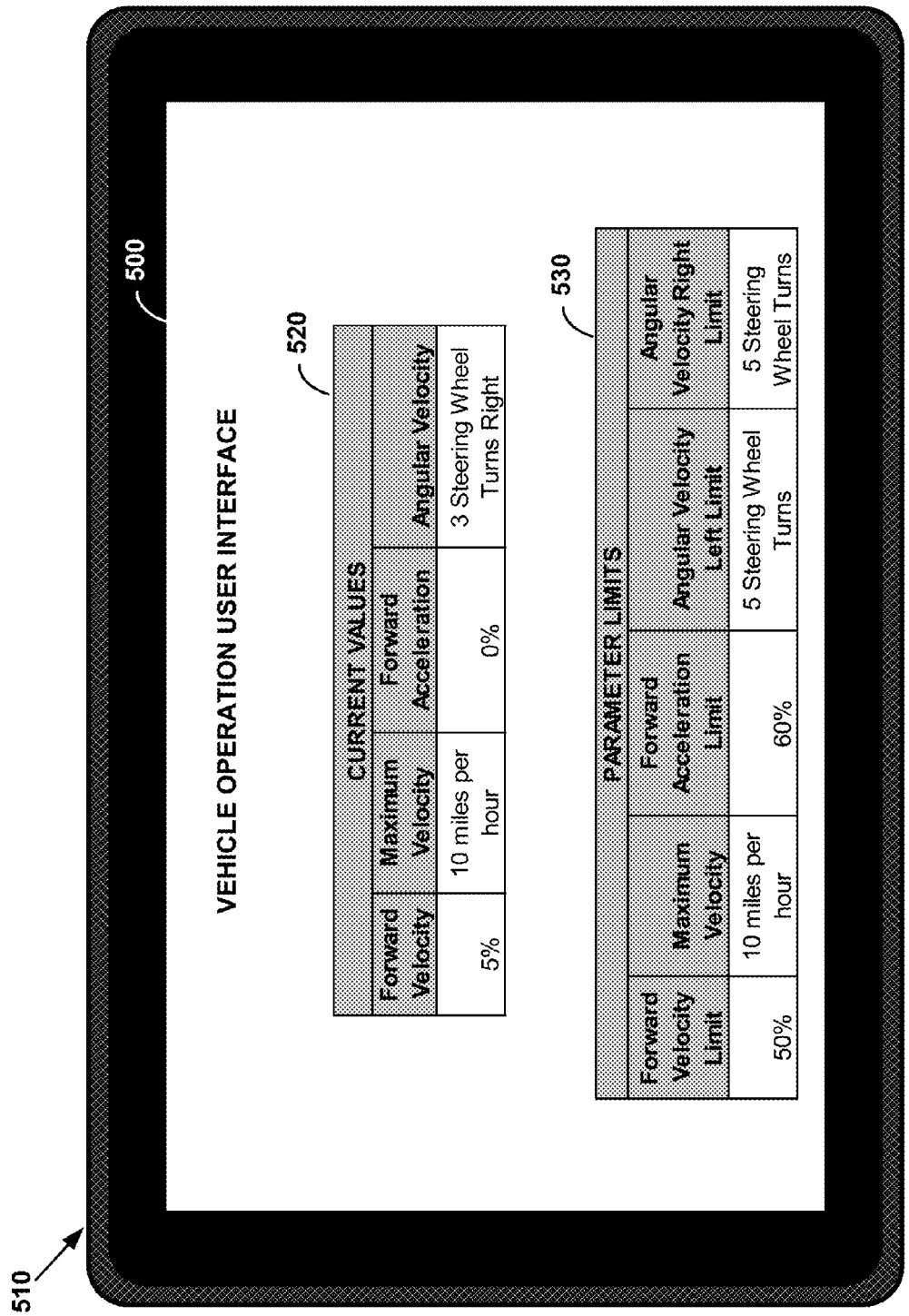
FIG. 5A illustrates an example user interface of a remote control system, according to an example embodiment.

The remote control system can provide a human machine interface (HMI) to the remote operator during teleoperation of the vehicle. FIG. 5A displays an example embodiment of a user interface for the remote operator. In the displayed embodiment, a user interface 500 is displayed on a user device 510. The device 510 may be a computing device, including a computer, personal computer, laptop, desktop, tablet, mobile phone, smartwatch, PDA, wearable device, or some other type of computing device. The user interface 500 includes current values table 520 and parameter limits table 530. In other embodiments, the user interface 500 may include more, fewer, and/or different items than those shown or described for FIG. 5A.

Current values table 520 displays forward velocity of the vehicle, the maximum velocity of the vehicle, the forward acceleration of the vehicle, and the angular velocity of the vehicle. In the displayed embodiment, the maximum velocity is 10 miles per hour. However, in other embodiments, the vehicle may have a different maximum velocity. In FIG. 5A, the forward velocity is expressed as a percentage of the maximum velocity. However, in other embodiments, the forward velocity may be expressed in a different manner, such as listing the actual speed (0.5 miles per hour). Also, forward acceleration is listed as a percentage of the maximum acceleration. In this case, the forward acceleration of 0% indicates that the vehicle is not accelerating along the direction of travel of the vehicle.

Additionally, the angular velocity is expressed as a number of steering wheel turns. The angular velocity also indicates the direction of the steering wheel turns, which in table 520 is to the "right." However, in other embodiments, angular velocity may be represented in a different manner than the one shown in FIG. 5A. For example, the angular velocity may be expressed as a percentage of the turning radius.

The turning radius indicates the smallest circular turn the vehicle is capable of making. Thus, the number of steering wheel turns required to execute a turn at the turning radius may be the maximum number of steering wheel turns for the vehicle. Thus, the system can express angular velocity as a percentage of the turning radius by determining the ratio between the current number of steering wheel turns and the maximum number of steering wheel turns for the vehicle. The system may then display the percentage corresponding to the determined ratio to display the angular velocity as a percentage of the turning radius.

For another example, the angular velocity may be expressed as a steering angle. The steering angle may describe the angle of the front wheels relative to the longitudinal axis of the vehicle. For example, when the vehicle is traveling straight, and the wheels are aligned with the longitudinal axis of the vehicle, the steering angle may be 0°. For another example, when the vehicle turns right, the wheels may turn to the right to a positive steering angle value. For yet another example, when the vehicle turns left, the wheels may turn to the left to a negative steering angle value. In some embodiments, the angular velocity limit may be expressed as a steering angle when the angular velocity limit corresponds to a portion of a full revolution of the steering wheel. The steering angle may be used to express angular velocity in other cases. In other embodiments, the current values table 520 may display more, fewer, and/or different values than those described and/or shown for FIG. 5A.

Parameter limits table 530 includes a forward velocity limit, a maximum velocity, a forward acceleration limit, an angular velocity left limit, and an angular velocity right limit. The forward velocity limit represents the maximum permissible value of forward velocity as a percentage of maximum velocity. However, in other embodiments, the forward velocity limit could be expressed as a speed limit (e.g., 5 miles per hour). Similarly, the forward acceleration limit is expressed as a percentage of the maximum acceleration of the vehicle. Additionally, the angular velocity limits to the left and right express angular velocity based on a number of steering wheel turns. Thus, according to table 530, a remote operator is limited from turning the steering wheel more than five wheel turns to the left or five wheel turns to the right. In other embodiments, the parameter limits table 530 may include more, fewer, and/or different values than those displayed.

Figure 5B:
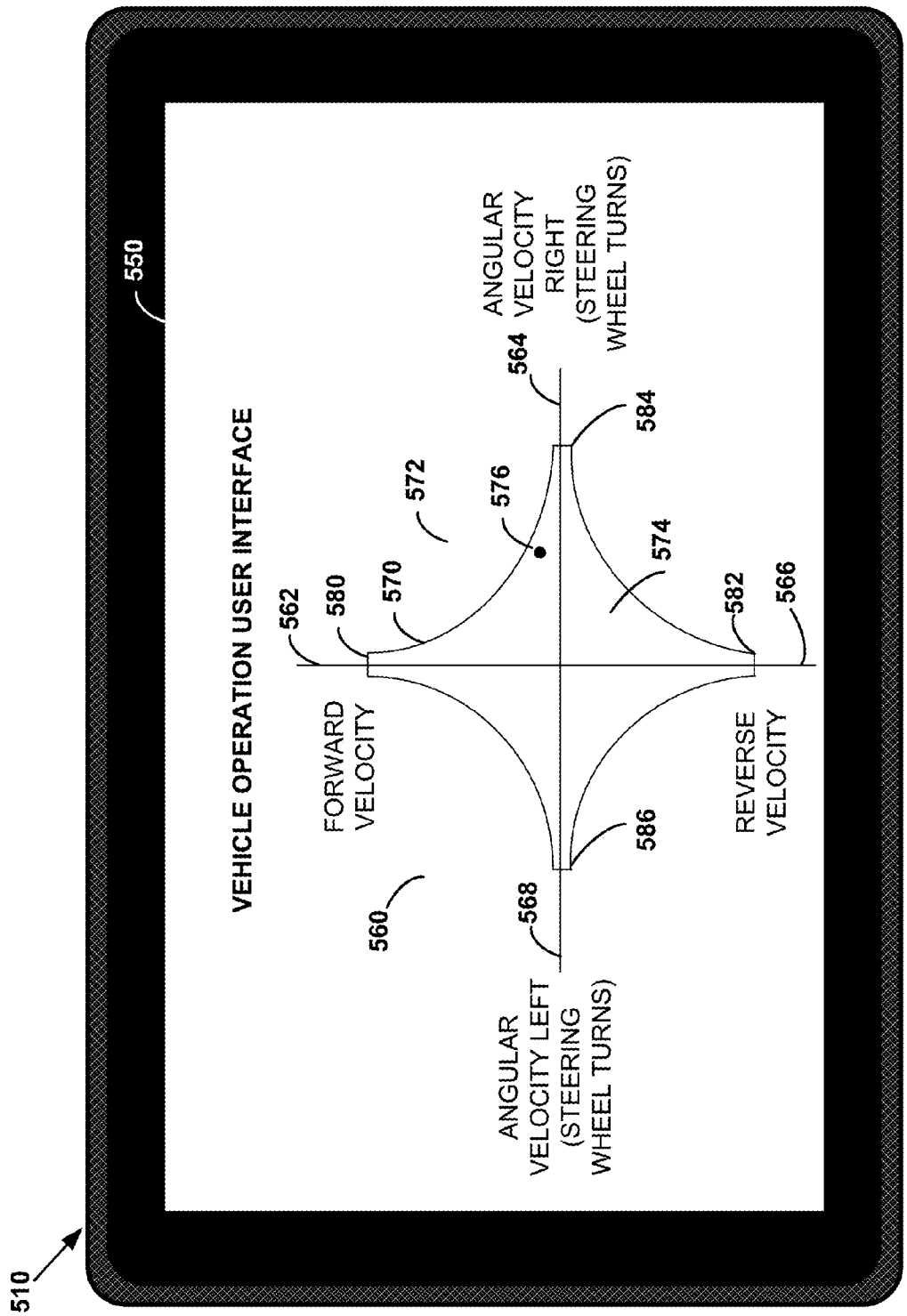
FIG. 5B illustrates another example user interface of a remote control system, according to an example embodiment.

FIG. 5B shows another example of the user interface provided by the remote control system to a remote operator for vehicle operation. FIG. 5B includes a user interface 550 displayed on a device 510. The user interface 550 includes the envelope diagram 560. Envelope diagram 560 includes a visual representation of the envelope of pairs of forward velocity and angular velocity values that are permitted by the system. Because lateral acceleration equals angular velocity multiplied by forward velocity, an envelope of permissible pairs of angular velocity and forward velocity values prevents excessive lateral acceleration values that may cause tip over or slide-off failures.

Diagram 560 includes a y-axis for velocity that has a forward velocity portion 562 for positive values of the y-axis, and reverse velocity portion 566 for negative values of the y-axis. Diagram 560 also includes an x-axis for angular velocity which includes an angular velocity portion 564 for angular velocity towards the right of the vehicle, and angular velocity portion 568 for angular velocity towards the left of the vehicle. Envelope diagram 560 includes constraint 570, which defines permissible pairs of forward velocity and angular velocity values based on lateral acceleration. Region 572 represents impermissible pairs of forward velocity and angular velocity values that result in excessive lateral acceleration of the vehicle or the load. Region 574 represents permissible pairs of forward velocity and angular velocity values. Point 576 represents a current pair of forward velocity and angular velocity values of the vehicle, which in this case is 5% of the maximum velocity of the vehicle and three steering wheel turns to the right, respectively.

Diagram 560 also contains forward velocity limit 580, which in FIG. 5B, is at 50% of the maximum forward velocity. Diagram 560 also includes reverse velocity limit 582, which is also at 50% of the maximum reverse velocity. Diagram 560 includes angular velocity rate limit 584 and angular velocity left limit 586, both of which have values of five steering wheel turns. While the displayed embodiment of envelope diagram 560 is symmetrical, in other embodiments, diagram 560 may be asymmetrical. For example, the reverse velocity limit 582 and/or angular velocity left 586 may be different from the corresponding forward velocity limit 580 and angular velocity right limit 584, in some embodiments. As a result, the envelope diagram 560 would be asymmetric and skewed towards the higher values.

Envelope diagram 560 indicates to a remote operator how one operation parameter may need to be compensated due to changes in the other operation parameter. For example, if for point 576, the remote operator chooses to take a sharper right turn by having the steering wheel rotated right all the way to five steering wheel turns to the right, then the remote operator may have to reduce the forward velocity of the vehicle to remain within the region 574 of permissible pairs of forward velocity and angular velocity for the vehicle. In other words, if the remote operator decides to take a sharper turn, then the remote operator needs to slow the vehicle down (i.e., decrease forward velocity) to prevent vehicle load failures, such as tip-over failure and/or slide-off failure. Although the displayed embodiment of FIGS. 5A and 5B display angular velocity in steering wheel turns, in other embodiments, angular velocity may be expressed as a percentage of a turning radius, a steering angle, or some other manner.

The remote control system may also provide features to a remote operator by way of a user interface that are not displayed in FIGS. 5A and 5B. For example, the HMI may allow an operator to override the HMI for one or more commands or limits (e.g., forward acceleration limit). The system may allow multiple different policies regarding overrides. In one embodiment, the system allows overrides of any type by any remote operator at any time. In another embodiment, the system only permits certain personnel to override the system. In some embodiments, the policy requires that an override only last for a specified amount of time. In some embodiments, overrides are not permitted. Other override policies are also possible.

The HMI may implement the angular velocity limit by providing steering assistance to the vehicle 300 by way of a force feedback system. For example, if the angular velocity limit is expressed as a steering angle, then as the steering angle of the current angular velocity approaches the steering angle angular velocity limit, the force feedback system can make it harder for the steering wheel to turn by increasing the resistance of the steering wheel. Further, when the steering angle reaches the limit, the force feedback system may lock the steering wheel to prevent the steering angle from exceeding the steering angle limit. Thus, the steering angle would be limited to permissible values within the steering angle limit. Other methods of using a force feedback system to enforce an angular velocity limit may also be possible.

The remote control system may also prevent operation of the vehicle above vehicle operation limits (e.g., forward velocity limit, angular velocity limit) without providing a user interface. For example, the vehicle and/or the remote control system may determine and enforce limits after determining them based on sensor data (e.g., forward velocity limit and angular velocity limit). In this case, if the remote operator attempts to exceed an enforced limit, such as forward velocity limit or angular velocity limit, the system may not allow the remote operator to increase the forward velocity or angular velocity above the limit. In particular, the remote control system may reject the commands of the remote operator and continue vehicle operation at the enforced limits, or some other pair of permissible values for forward velocity and angular velocity. Furthermore, the remote control system may also lock the controls to prevent additional attempts by the remote operator to override the enforced limits. Thus, a remote control system can limit the operation of the vehicle (e.g., enforcing the forward velocity limit, angular velocity limit, and/or forward acceleration limit) during teleoperation without providing a user interface to the remote operator.

Figure 6:
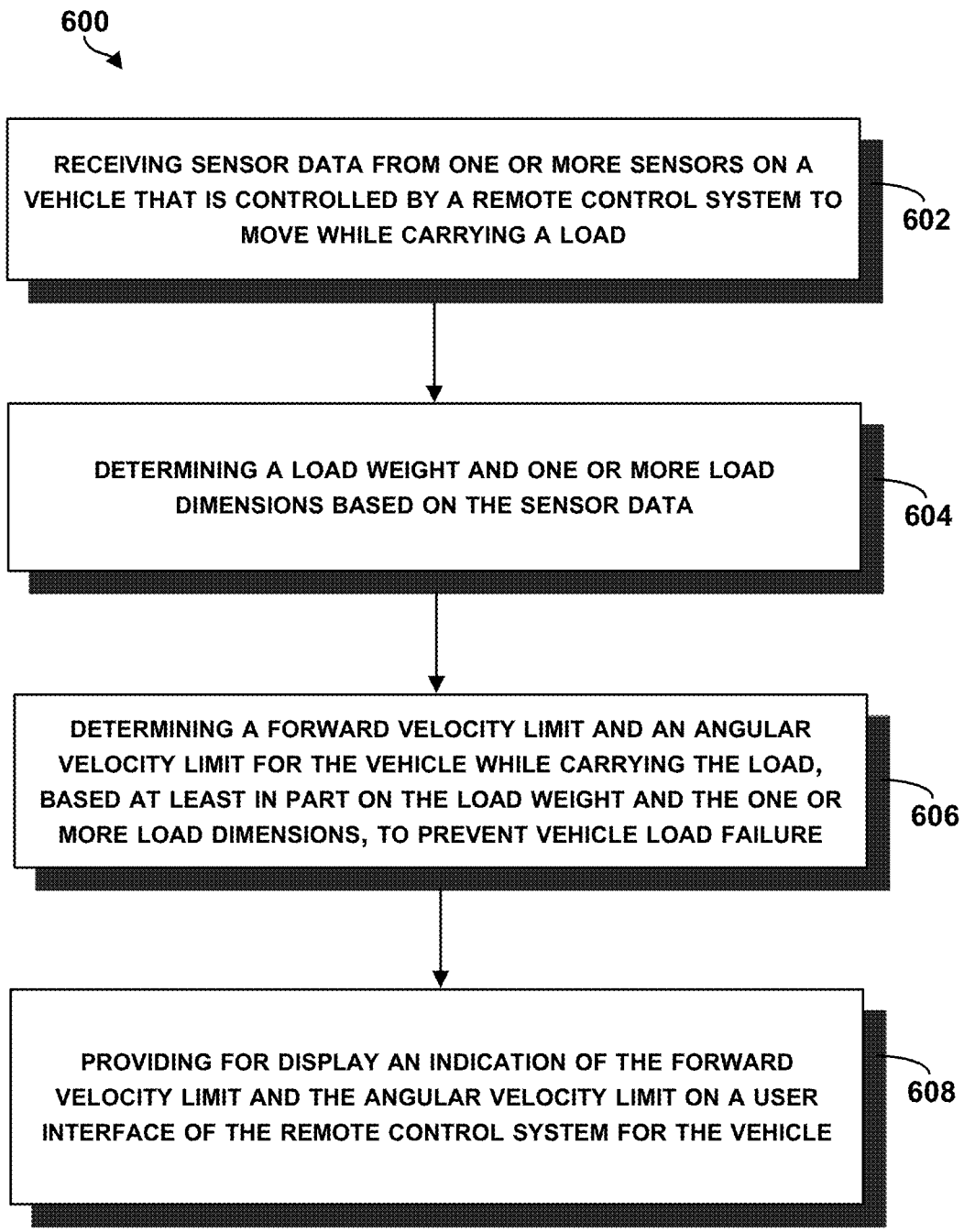
FIG. 6 is a block diagram of a method, according to an example embodiment.

FIG. 6 illustrates a flowchart showing the method 600 that may allow for implementing limits for a vehicle carrying a load to prevent vehicle load failures, according to an example embodiment. The method 600 may be carried out by a remote control system, such as the control system illustrated and described with respect to FIGS. 1A-1B. However, a remote control system, or some other device, that is different from the control system described in FIGS. 1A-1B may also execute method 600.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 6. Where used, program code can be stored on any type of computer-readable medium, for example, such as a storage device including a disk or hard drive.

In addition, each block of the flowchart shown in FIG. 6 may represent circuitry that is wired to perform the specific logical functions in the process. Unless specifically indicated, functions in the flowchart shown in FIG. 6 may be executed out of order from that shown or discussed, including substantially concurrent execution of separately described functions, or even in reverse order in some examples, depending on the functionality involved, so long as the overall functionality of the described method is maintained.

As shown by block 602 of FIG. 6, method 600 may involve receiving sensor data from one or more sensors on a vehicle that is controlled by a remote control system to move while carrying a load. In some examples, the sensors may include force sensors in the wheels of the vehicle. In additional examples, the sensors may include optical sensors, such as laser scanners, onboard the vehicle.

Method 600 may further involve determining a load weight and one or more load dimensions based on the sensor data, as shown by block 604 of FIG. 6. In some examples, the load dimensions may include a load height, a load length, and a load with. In additional examples, the load height may be measured from the ground to the top of the load height.

Method 600 may also involve determining a forward velocity limit and an angular velocity limit for the vehicle while carrying the load, based at least in part on the load weight and the one or more load dimensions, to prevent vehicle load failure, as shown by block 606 of FIG. 6. In some examples, the system may rely on the load height to determine the forward velocity limit and/or the angular velocity limit. In additional examples, the system may prevent vehicle load failures, including vehicle tip-over failure, load tip-over failure, load slide-off failure, and/or collisions with the surrounding environment.

Method 600 may additionally involve providing for display an indication of the forward velocity limit and the angular velocity limit on a user interface of the remote control system for the vehicle, as shown by block 608 of FIG. 6. In some examples, the user interface may indicate an envelope of permissible pairs of forward velocity and angular velocity values. In additional examples, the user interface may allow the remote operator to override the system for certain forward velocities and/or angular velocities. In further examples, a forward velocity limit may be displayed as a speed limit (e.g., miles per hour, meters per second, etc.) while the angular velocity limit may be displayed as a number of steering wheel turns in a particular direction. In an additional example, the forward velocity limit may be displayed as a percentage of a maximum velocity of the vehicle.

Although the disclosed system and methods have been described in the context of teleoperation of a vehicle, the disclosed system and methods could be applied to applications where the driver of the vehicle is at the vehicle. In particular, the system can implement and enforce vehicle operation limits (e.g., forward velocity limit, angular velocity limit) while an operator is at the vehicle and driving the vehicle. For example, the remote control system may enforce the angular velocity limit by using a force feedback system to increase steering wheel resistance as the steering angle approaches the angular velocity limit. For another example, the user interface indicating current vehicle operation values, vehicle operation limits, and an envelope of permissible pairs of values of forward velocity and angular velocity may also be provided at the vehicle to an operator driving the vehicle.

While the disclosed system and methods have been described in the context of a warehouse application and environment, other applications and environments are also possible for the disclosed system and methods. For example, other environments where vehicle operation limits for remotely controlled vehicles may be applicable include manufacturing facilities, mailing or shipping facilities, airports, hospitals, or other environments. Furthermore, other applications where vehicle operation limits for remotely controlled vehicles may be applicable include construction, shipping, manufacturing, healthcare, and/or other applications. Other applicable environments and applications for the disclosed system and methods may also be possible.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving sensor data from one or more sensors on a vehicle that is controlled by a remote control system to move while carrying a load;
   determining a load weight and one or more load dimensions based on the sensor data;
   determining a forward velocity limit and an angular velocity limit for the vehicle while carrying the load, based at least in part on the load weight and the one or more load dimensions, to prevent vehicle load failure; and
   providing for display an indication of the forward velocity limit and the angular velocity limit on a user interface of the remote control system for the vehicle.

2. The method of claim 1, further comprising:
   determining a forward acceleration limit for the vehicle while carrying the load, based at least in part on the load weight and the one or more load dimensions, to prevent vehicle load failure; and
   providing for display an indication of the forward acceleration limit on the user interface of the remote control system for the vehicle.

3. The method of claim 1, further comprising:
   determining a current lateral acceleration of the vehicle while carrying the load, based at least in part on a current vehicle velocity and a current vehicle angular velocity; and
   determining the forward velocity limit and the angular velocity limit based on the current lateral acceleration of the vehicle.

4. The method of claim 1, wherein the one or more load dimensions include a load height, a load length, and a load width.

5. The method of claim 4 further comprising:
determining a tip-over torque of the vehicle while carrying the load based at least in part on a vehicle weight, the load weight, the load height, and a current lateral acceleration of the vehicle, wherein the tip-over torque of the vehicle indicates an amount of torque on the vehicle generated by the current lateral acceleration of the vehicle;
determining a tip-over torque of the load based at least in part on the load weight, the load height, and a current lateral acceleration of the load, wherein the tip-over torque of the load indicates an amount of torque on the load generated by the current lateral acceleration of the load; and
determining the forward velocity limit and the angular velocity limit based on the tip-over torque of the vehicle and the tip-over torque of the load.

6. The method of claim 1 further comprising:
determining, for the vehicle carrying the load in a surrounding environment containing one or more objects, one or more respective minimum distances between the vehicle and the one or more objects to prevent collisions between the vehicle and the one or more objects; and
determining the forward velocity limit and the angular velocity limit to maintain the one or more respective minimum distances between the vehicle and the one or more objects.

7. The method of claim 1, further comprising:
determining the load weight based on sensor data from at least one force sensor on the vehicle; and
determining the one or more load dimensions based on sensor data from one or more optical scanners on the vehicle.

8. The method of claim 5, further comprising:
estimating a center of mass for the vehicle carrying the load based at least in part on a vehicle weight, the load weight, load height, load length, and load width;
determining the tip-over torque of the vehicle carrying the load based on the estimated center of mass for the vehicle;
estimating a center of mass for the load based at least in part on the load weight, load height, load length, and load width; and
determining the tip-over torque of the load based on the estimated center of mass for the load.

9. The method of claim 8, further comprising:
receiving additional sensor data from the vehicle carrying the load, wherein the additional sensor data includes weight distribution data for the load;
updating the center of mass estimate for the vehicle carrying the load based on the received additional sensor data; and
updating the center of mass estimate for the load based on the received additional sensor data.

10. The method of claim 1, wherein the vehicle load failure includes a vehicle tip-over failure that occurs when the vehicle carrying the load tips over.

11. The method of claim 1, wherein the vehicle load failure includes a load tip-over failure that occurs when the load tips over off of the vehicle.

12. The method of claim 1, wherein the vehicle load failure includes a load slide-off failure that occurs when the load slides off the vehicle, wherein the method of claim 1 further comprises:
determining a force of the load on the vehicle, based on at least the load weight and a current lateral acceleration of the vehicle; and
determining the forward velocity limit and angular velocity limit to prevent the load slide-off failure based on the force of the load on the vehicle.

13. The method of claim 1 further comprising:
determining a maximum velocity of the vehicle; and
providing an indication of the velocity limit by displaying a percentage of the maximum velocity that corresponds to the forward velocity limit.

14. A non-transitory computer-readable medium storing instructions that are executable by one or more computing devices, wherein executing the instructions causes the one or more computing devices to perform functions comprising:
receiving sensor data from one or more sensors on a vehicle that is controlled by a remote control system to move while carrying a load;
determining a load weight and one or more load dimensions based on the sensor data;
determining a forward velocity limit and an angular velocity limit for the vehicle while carrying the load, based at least in part on the load weight and the one or more load dimensions, to prevent vehicle load failure; and
preventing operation of the vehicle by the remote control system above the forward velocity limit and the angular velocity limit.

15. The non-transitory computer-readable medium of claim 14, wherein executing the instructions further causes the one or more computing devices to perform functions comprising:
determining a current lateral acceleration of the vehicle while carrying the load, based at least in part on a current vehicle velocity and a current vehicle angular velocity; and
determining the forward velocity limit and the angular velocity limit based on the current lateral acceleration of the vehicle.

16. The non-transitory computer-readable medium of claim 14, wherein the one or more load dimensions include a load height, a load length, and a load width.

17. The non-transitory computer-readable medium of claim 16, wherein executing the instructions further causes the one or more computing devices to perform functions comprising:
determining a tip-over torque of the vehicle while carrying the load based at least in part on a vehicle weight, the load weight, the load height, and a current lateral acceleration of the vehicle, wherein the tip-over torque of the vehicle indicates an amount of torque on the vehicle generated by the current lateral acceleration of the vehicle;
determining a tip-over torque of the load based at least in part on the load weight, the load height, and a current lateral acceleration of the load, wherein the tip-over torque of the load indicates an amount of torque on the load generated by the current lateral acceleration of the load; and
determining the forward velocity limit and the angular velocity limit based on the tip-over torque of the vehicle and the tip-over torque of the load.

18. A system comprising:
a processor, and
a memory storing instructions that when executed by the processor cause the system to perform functions comprising:
receiving sensor data from one or more sensors on a vehicle that is controlled by a remote control system to move while carrying a load;

determining a load weight and one or more load dimensions based on the sensor data;

determining a forward velocity limit and an angular velocity limit for the vehicle while carrying the load, based at least in part on the load weight and the one or more load dimensions, to prevent vehicle load failure; and providing for display an indication of the forward velocity limit and the angular velocity limit on a user interface of the remote control system for the vehicle.

19. The system of claim 18, wherein the vehicle load failure includes a vehicle tip-over failure that occurs when the vehicle carrying the load tips over.

20. The system of claim 18, wherein the vehicle load failure includes a load tip-over failure that occurs when the load tips over off of the vehicle.

* * * * *